United States Patent
Landgraf

(10) Patent No.: US 9,579,963 B2
(45) Date of Patent: Feb. 28, 2017

(54) MOTOR VEHICLE HAVING STRUCTURALLY INTEGRATED BATTERY ELEMENTS

(71) Applicant: AUDI AG, Ingolstadt (DE)

(72) Inventor: Johannes Landgraf, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/114,698

(22) PCT Filed: Nov. 5, 2014

(86) PCT No.: PCT/EP2014/002963
§ 371 (c)(1),
(2) Date: Jul. 27, 2016

(87) PCT Pub. No.: WO2015/113579
PCT Pub. Date: Aug. 6, 2015

(65) Prior Publication Data
US 2016/0347160 A1    Dec. 1, 2016

(30) Foreign Application Priority Data

Jan. 31, 2014 (DE) .................. 10 2014 001 289

(51) Int. Cl.
*B60K 1/04* (2006.01)
*B62D 21/15* (2006.01)
*B60R 16/04* (2006.01)

(52) U.S. Cl.
CPC .............. *B60K 1/04* (2013.01); *B60R 16/04* (2013.01); *B62D 21/15* (2013.01);
(Continued)

(58) Field of Classification Search
CPC .............. B60K 1/04; B60K 2001/0405; B60K 2001/0411; B60K 2001/0416; B60K 2001/0422; B60K 2001/0427; B60K 2001/0433; B60K 2001/0438; B60R 16/04; B62D 21/15; B60Y 2306/01
See application file for complete search history.

(56) References Cited

U.S. PATENT DOCUMENTS

| 4,174,014 A | * | 11/1979 | Bjorksten | ................ B60K 1/04 180/68.5 |
| 5,390,754 A | * | 2/1995 | Masuyama | .............. B60K 1/04 105/51 |

(Continued)

FOREIGN PATENT DOCUMENTS

| DE | 10 2008 010 822 A1 | 8/2009 |
| DE | 10 2008 059 973 A1 | 6/2010 |

(Continued)

OTHER PUBLICATIONS

International Search Report issued by the European Patent Office in International Application PCT/EP2014/002963.

*Primary Examiner* — Laura Freedman
(74) *Attorney, Agent, or Firm* — Henry M. Feiereisen LLC

(57) ABSTRACT

A motor vehicle includes several battery elements placed in modules of a first type and modules of a second type. The battery elements in each module of first type are grouped together in an assembly such that the battery elements can shift when exposed to a force, while the assembly is deformable. In each module of second type, the battery elements can shift, when exposed to the force, without being damaged while retaining their shape. The modules of first type are installed in a first region of the motor vehicle of a low stiffness compared to a second region, in which a body of the motor vehicle is designed for force-dissipating deformation in the event of an accident, and the modules of second type are installed in the second region, in which the body of the (Continued)

motor vehicle is designed to retain its shape in the event of an accident.

14 Claims, 2 Drawing Sheets

(52) U.S. Cl.
CPC ............. *B60K 2001/0411* (2013.01); *B60K 2001/0416* (2013.01); *B60K 2001/0422* (2013.01); *B60K 2001/0427* (2013.01); *B60K 2001/0433* (2013.01); *B60K 2001/0438* (2013.01); *B60Y 2306/01* (2013.01)

(56) References Cited

U.S. PATENT DOCUMENTS

| | | | |
|---|---|---|---|
| 5,704,644 A * | 1/1998 | Jaggi | B60K 1/00 180/311 |
| 8,051,934 B2 * | 11/2011 | Kiya | B60K 1/04 180/274 |
| 8,573,647 B2 * | 11/2013 | Enning | B60K 1/04 180/232 |
| 2012/0043147 A1 | 2/2012 | Milner et al. | |
| 2013/0270864 A1 | 10/2013 | Young et al. | |
| 2013/0306266 A1 | 11/2013 | Favaretto | |
| 2014/0117716 A1 | 5/2014 | Patberg et al. | |

FOREIGN PATENT DOCUMENTS

| | | |
|---|---|---|
| DE | 10 2009 006 991 A1 | 8/2010 |
| DE | 10 2009 040 598 A1 | 3/2011 |
| DE | 10 2010 033 806 A1 | 2/2012 |
| DE | 10 2010 034 925 A1 | 2/2012 |
| DE | 10 2010 048 102 A1 | 4/2012 |
| DE | 10 2011 051 698 A1 | 1/2013 |
| DE | 10 2011 106 090 A1 | 1/2013 |
| DE | 10 2012 000 622 A1 | 7/2013 |
| DE | 10 2012 203 892 A1 | 9/2013 |
| DE | 10 2012 012 897 A1 | 1/2014 |
| FR | 2 961 442 A1 | 12/2011 |
| JP | 05159761 A * | 6/1993 |
| JP | 2003045392 A * | 2/2003 |
| JP | 2006035925 A * | 2/2006 |

* cited by examiner

MOTOR VEHICLE HAVING STRUCTURALLY INTEGRATED BATTERY ELEMENTS

CROSS-REFERENCES TO RELATED APPLICATIONS

This application is the U.S. National Stage of International Application No. PCT/EP2014/002963, filed Nov. 5, 2014, which designated the United States and has been published as International Publication No. WO 2015/113579 and which claims the priority of German Patent Application, Serial No. 10 2014 001 289.1, filed Jan. 31, 2014, pursuant to 35 U.S.C. 119(a)-(d).

BACKGROUND OF THE INVENTION

The invention relates to a motor vehicle having a plurality of battery elements.

The storage of electrical energy is playing an ever increasing role in motor vehicles. The battery cells, which are used in motor vehicles for storing energy, are then oftentimes arranged in large battery systems. These battery systems usually have a plurality of battery cells and are installed in the motor vehicle in a region that is exposed to little force. As a result, either the battery size is limited or the battery cells must be protected by massive reinforcement measures. This causes considerable increase in weight. There are known solutions which describe so-called crash-compatible battery systems. These battery systems include modules of e.g., trapezoidal shape to thereby allow a shift that deforms the assembly and destroys energy, so that the battery elements are not destructed. By using additional crash profiles, more energy can be dissipated.

For example, FR 2961442 describes a battery arrangement, which absorbs energy in the event of an accident as it deforms. Wedge-shaped battery cells are hereby shifted relative to one another. DE 10 2008 059 973 A1 discloses a battery unit, in which the battery cells are arranged in a two-shell construction. Energy absorption is realized here as the outer shell undergoes deformation while the battery cells, which are arranged in the inner shell, shift at the same time. DE 10 2008 010 822 A1 also discloses a deformable battery housing which is designed to be deformable, when the battery housing is exposed to a force impact, while the shape of individual battery cells is retained.

DE 10 2010 033 806 A1 proposes a battery pack which has a plurality of battery elements, with deformation elements being arranged there between. These deformation elements are located in intermediate spaces between the battery elements, so that the battery elements shift as the deformation elements undergo deformation in the event of an external application of force. This deformation absorbs kinetic energy.

DE 10 2011 106 090 A1 relates to an assembly of battery modules in a vehicle floor of a vehicle. At least two adjacent battery modules have respective sliding faces, along which the two adjacent battery modules can move relative to one another as a result of an application of force. This allows the battery modules to move out of the way in the event of a crash without being destroyed. Also DE 10 2010 034 925 A1 relates to an energy storage arrangement in a floor region of a vehicle. An underfloor mounting plate fixes hereby the energy storage carrier and thus the energy storage device to an underfloor structure of the vehicle. A cover plate in the floor region of the vehicle covers at least the energy storage carrier in a media-tight manner with respect to the vehicle interior.

SUMMARY OF THE INVENTION

It is object of the present invention to increase the operational safety of a motor vehicle having a plurality of battery elements and to save at the same time weight compared to existing solutions.

This object is achieved in accordance with the invention by the subject matter of the independent patent claim. Advantageous embodiments become apparent from the dependent claims, the description, and the figures.

A motor vehicle according to the invention includes a plurality of battery elements which are present in modules of a first type and a second type, each module having a plurality of battery elements. In a module of first type, the battery elements are arranged in an assembly so as to be slideable relative to one another in dependence on a force impact, accompanied by a deformation of the assembly. The shift of the battery elements thus destroys forces and prevents destruction of the individual battery cells. This can, for example, be realized by one or more of the afore-described known ways. A module of first type may therefore also relate to an arrangement of several, in particular uniform, module elements, each including its own housing and several battery elements. In a module of second type, the battery elements are arranged such that, depending on a force impact, they retain their shape and are non-destructive, when being displaced. In other words, the modules of second type can be shifted only as a unit, i.e. in their entirety. The module is thus designed for maximum stability. In the event, the module is exposed to forces of such size that the module is deformed, the module becomes destroyed, i.e. the housing of the module and/or at least one battery element accommodated in the module contained is destroyed.

To increase the operational safety of the motor vehicle while still saving weight, it is provided that battery elements are installed as modules of first type in a first region of the motor vehicle of low stiffness in comparison to a second region of the motor vehicle, with a body of the motor vehicle being designed in the first region for force-dissipating deformation in the event of an accident, and battery elements are installed as modules of second type in the second region of the motor vehicle of greater stiffness in comparison to the first region of the motor vehicle, with the body of the motor vehicle being designed in the second region to retain the shape in the event of an accident. The battery system thus is comprised two different subsystems. As a result, the first region, which is configured for maximum energy absorption when exposed to a force, in particular, for example, by a presence of so-called energy-absorbing elements, permits a shift of the battery modules, and a second region of the motor vehicle, which is configured for maximum stiffness and located as a structural reinforcement in particular close to frame parts of the motor vehicle or in or on the safety cell or passenger cell. The first regions may involve also so-called crash zones which are also designated as "crumple zone" or "deformation zone".

This has the advantage that synergy effects are established between the body and the battery elements such that functions of the body can be partly assumed by the modules of first and second types of the battery elements. As a result, the battery elements significantly contribute to vehicle safety by being able to absorb energy on one hand, and, on the other hand, due to their configuration as modules of second type, as structural reinforcement of the motor vehicle. The synergy effect is additionally able to save weight. Also, the entire energy content of the motor vehicle, i.e. the total amount of electric energy that can be stored in the motor vehicle can be increased, because battery elements can be arranged also in regions which heretofore, especially for safety reasons, were not appropriate for battery elements.

In particular, the storage capacity per volume may be less in modules of first type as in modules of second type. This has the advantage that deformation elements or the like can be provided between the battery elements in the modules of first type.

Preferably, the battery elements involve high-voltage battery elements. In particular battery elements may also be involved here which supply a sole driving motor of the motor vehicle with the energy required for propulsion. This has the advantage that the especially dangerous destruction of the battery elements, when involving high-voltage battery elements, can be prevented, and thus the safety of the occupants is ensured.

In one embodiment of the invention, provision is made to arrange a module of second type on a frame of the motor vehicle and/or part of the frame. Since the frame of a body is characterized by a particular stiffness, the synergy effect between the stiffness of the body and the battery modules of second type, as described above, becomes especially apparent. When being arranged on the frame of the motor vehicle, the battery cells are thus particularly well protected and at the same time contribute to the stiffness of the body. In particular, the module can be connected to the frame in a force-fitting manner. When the module is part of the frame, this results especially in a weight saving.

Provision may be made to arrange a module of second type longitudinally on a vehicle longitudinal member and/or to connect two vehicle longitudinal members in the manner of a cross member. This has the advantage of a specific reinforcement in longitudinal direction and transverse direction of the vehicle. Since the vehicle longitudinal member is very long, a particularly great number of battery elements can be attached thereto and contribute to the operational safety of the vehicle. When a module connects two vehicle longitudinal members in the manner of a cross member, such a cross member can be dimensioned weaker or the stability in the transverse direction can be increased while maintaining the configuration of the cross member, and thus weight can be saved.

It may further be provided that a module of second type is connected, in particular on at least one area oriented in or in opposition to the travel direction of the motor vehicle surface, to a vehicle longitudinal member and is used itself in a section as a longitudinal member replacement. The battery module is thus itself a supporting part of the body. This is accompanied by weight and space savings.

It may further be provided that, in particular transversely to a travel direction of the motor vehicle, two modules of first type are arranged adjacent to a module of second type. This has the advantage that the module of second type is protected by the modules of first type in the manner of a buffer. As a result, damage to the battery elements in the module of first type is less likely.

In a further embodiment of the invention, it is provided that a module of first type adjoins modules of second type on two opposite sides. This is provided in particular in a direction transverse to the travel direction. This has the advantage that in the presence of a force impact upon one of the modules of second type, this force is dispersed across a large area onto the module of first type, so that a displacement of one of the two modules of second type results in a greatest possible force absorption by the module of first type. Safety is thereby also increased in the space above the modules of second type.

In a further advantageous embodiment, it is provided that at least one module is connected in a force-fitting manner to a vehicle underfloor. This has the advantage that the properties of the vehicle underfloor can be assisted in terms of its behavior in particular by the modules in the event of an accident. Especially, when connected to a module of second type, the stability of the vehicle underfloor is increased in the involved region; in particular when connected to a module of first type, the energy absorption capacity of the vehicle underfloor is increased. Both contribute to an increase in the operating safety of the motor vehicle.

In an advantageous embodiment, it is provided that modules of second type are arranged underneath a seating area of the motor vehicle. This has the advantage that the stability of the seating area is further reinforced, so that the living space of the occupants of the motor vehicle is maintained even better in the event of an accident.

In a further advantageous embodiment, it is provided that modules of first type are arranged underneath a tunnel region between two seating areas of the motor vehicle. This has the advantage that the passenger cell is able to absorb additional energy in the absence of any need to deform the seating areas for this additional absorption. Thus, the living space of the occupants is fully preserved, even though the passenger cell absorbs additional energy.

In a preferred embodiment, it is provided that a module of first type and a module of second type are arranged in the forward structure, and in particular the module of first type is located in a deformation zone of the motor vehicle. This has the advantage that the energy absorption capacity of the motor vehicle in the forward structure, in particular in the deformation zone, and thus the safety of operation is increased. Moreover, the installation of battery elements, in particular of high-voltage battery elements, now becomes even possible in the forward structure while still maintaining the safety of the occupants and complying with the relevant safety regulations. Especially the arrangement of battery elements in the forward structure has the advantage of a significant increase in energy content installed in the motor vehicle. Likewise, a module of first type and a module of second type can be arranged in the rearward structure.

BRIEF DESCRIPTION OF THE DRAWING

Further features of the invention will become apparent from the following description of preferred exemplary embodiments of the invention, and with reference to the figures. It is hereby shown in.

DETAILED DESCRIPTION OF PREFERRED EMBODIMENTS

Figure 1:
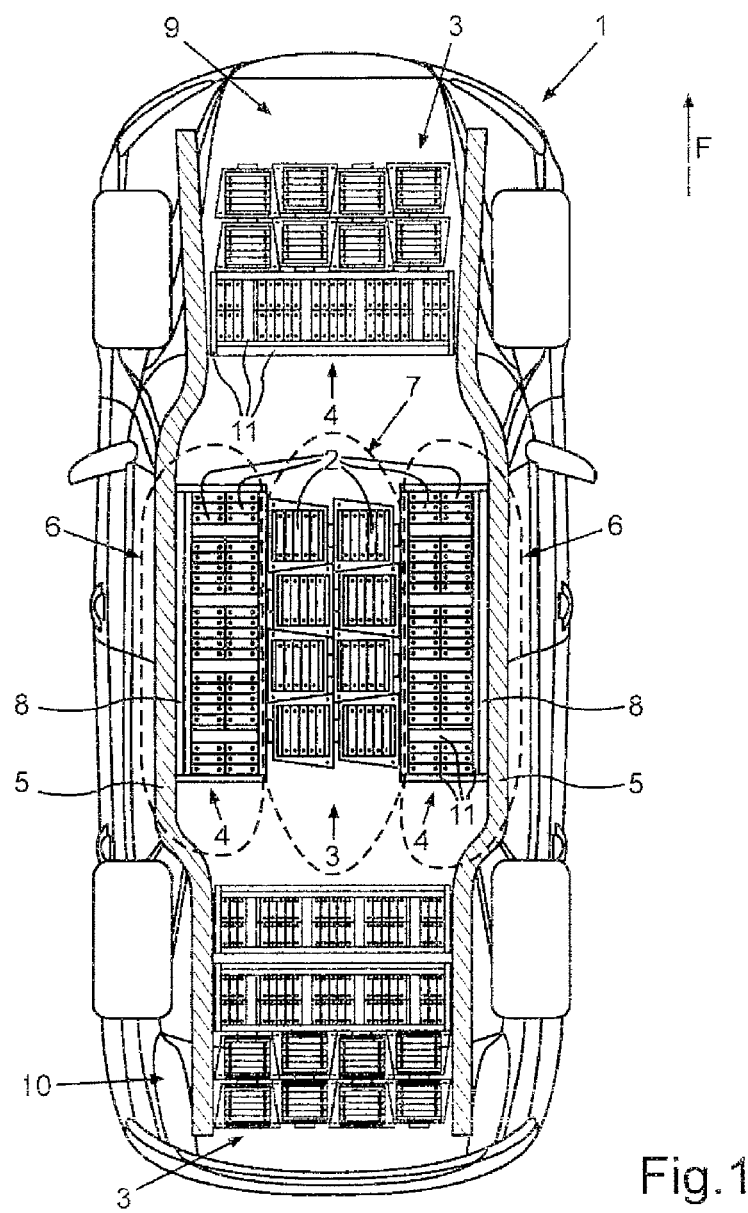
FIG. 1 a top view of a schematic representation of an exemplary embodiment of a motor vehicle according to the invention, and FIG. 2 a top view of a schematic representation of a further exemplary embodiment of a motor vehicle according to the invention.

Identical or functionally identical components are provided here with the same reference numerals.

FIG. 1 shows a top view of a schematic representation of an exemplary embodiment of a motor vehicle according to the invention. A motor vehicle 1 includes here two longitudinal members 5, between which a plurality of battery modules of the first type 3 and a plurality of battery modules of the second type 4 are arranged. The modules of the second type 4 adjoin the longitudinal members 5. The modules of the second type 4 involve compact arrangements of battery elements 2, i.e. battery cells, which are embedded by a frame 11 of the modules in a longitudinal member structure and cross member structure. The frame 11 serves primarily to construct the module of second type 4 stiff enough so that it can be shifted in its entirety as a result of an application of force and the individual battery elements 2 are not damaged. The stable construction enables the modules of second type 4 to be used as a vehicle structural reinforcement at the same time. For that purpose, it is possible to bolt the longitudinal and cross members of the frame 11, which, in the shown example, extend perpendicular to one another and form the housing of the module of second type 4, with the vehicle underfloor.

In the present example, modules of the second type 4 are located in or underneath seating areas 6 of the motor vehicle 1 on the vehicle longitudinal members 5. The modules of the second type are arranged directly adjacent to the longitudinal members 5 and extend underneath the seating areas 6 of the motor vehicle 1 in parallel relation to the travel direction F. In classical vehicle design, the vehicle structure underneath the seats should be constructed very stiff to preserve the living space for the occupant. By integrating the modules of second type 4 in the area, this area can be further reinforced. One or more energy absorbing elements 8 are respectively provided in the present example between the modules of second type 4 and the vehicle longitudinal members 5. In order to realize additional reinforcement, it is also possible in the present example to continue the cross members of the frame 11 of the modules of the second type 4 transversely to the travel direction, i.e. to prolong them, so as to establish between the two longitudinal members 5 an additional bracing in the manner of a body cross member.

Arranged between the two modules of second type 4, which are attached to the longitudinal members 5, is a module of first type 3 in the example shown. The shiftability of the individual components of the module of first type 3, accompanied by a deformation of the assembly, results in the present case from the trapezoidal shape of said individual components or modules elements. The module of first type 3 is located here underneath the so-called tunnel region 7 of the passenger cell. The tunnel region 7 represents in classic vehicle design a deformation zone. Thus, the behavior of the modules 3, 4 in the underfloor corresponds to the behavior of the vehicle structure lying above. In the event of a side crash, i.e. a side impact, the modules of second type 4 are shifted as a whole and deform the module of first type 3 lying in the center. As a result, the module of first type 3 absorbs energy, which otherwise would have to be absorbed by other components of the body. To increase the stiffness in the seating areas 6, the longitudinal member structure and cross member structure of the frame 11 of the modules of second type 4 can be connected in a force-fitting manner to the body, e.g. the underfloor, in particular bolted. A reason for using bolting is the option to disassemble the modules of second type 4 without destruction.

In addition to the implementation in the underfloor underneath a passenger cell or safety cell, an arrangement of modules of first type 3 and modules of second type 4 in the area of the rearward structure 10 or in the forward structure 9 can also increase the safety of operation and stability of the motor vehicle 1. In the example shown, a module of the second type 4 and a module of the first type 3 are respectively arranged between the longitudinal members 5. In the embodiment shown, the module of the second type 4, i.e. the more compact battery element arrangement, is oriented transversely to the vehicle direction F, so that, for example, the two longitudinal members 5 are mechanically linked to one another in the manner of a cross member. The module of first type 3 is hereby arranged in parallel relation to the module of second type 4, specifically in the rearward region 10 behind and in the forward structure 9 anteriorly of the module of second type. 4 The module of second type 4 is thus respectively positioned between passenger cell and module of first type. In the event of an accident in or in opposition to the travel direction F, the module of first type 3 can initially shift to absorb forces, accompanied by a deformation of the assembly, and then transmit remaining forces to the module of second type 4. Depending on the adaptation of the behavior of the body of the motor vehicle 1, it is also possible to reverse this arrangement. Then, a module of first type 3 would be arranged between a module of second type 4 and the passenger cell. Of course, it is also possible to accommodate battery elements 2 only underneath the passenger cell or in the rearward structure 10 or in the forward structure 9 and any combination of different regions.

Figure 2:
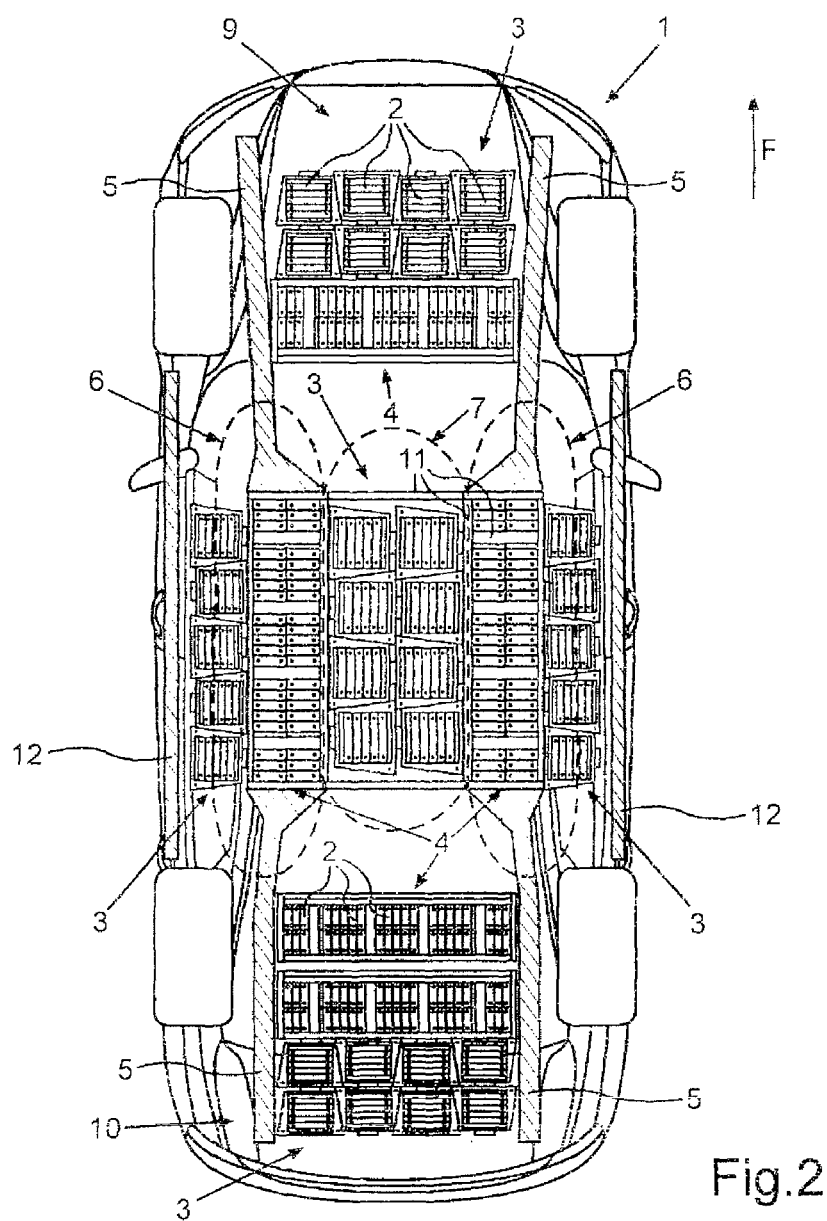

FIG. 2 shows a top view of a schematic representation of another embodiment of a motor vehicle. The arrangement of battery elements 2 or the modules of first type 3 and the modules of second type 4 in the forward structure 9 and rearward structure 10 is the same as shown in FIG. 1 and described. The construction significantly deviates, however, from the preceding structure in the central region of the motor vehicle, i.e. in the area of the passenger cell. The longitudinal members 5 are now replaced in part by modules of second type 4. Hereby, at least one of the total of four longitudinal members 5 is anchored on each side in travel direction F and in opposition to the travel direction by two modules of second type 4. This is realized on both sides in the region of the passenger cell of the motor vehicle 1, and the two modules of second type 4 are connected via prolonged cross member structures of their respective frames 11, as already indicated in the description of FIG. 1, in a manner of a cross member. Thus, the stability and stiffness between the longitudinal members 5 are increased. A module of first type 3 is here arranged again, as known from FIG. 1, between the two modules of second type 4. In addition to this central module of first type 3, which again is arranged in a tunnel region 7 between two seating areas 6, the two modules of second type 4 are, however, each adjoined also on their outer sides, i.e. in a direction transverse to the travel direction F, by a module of first type 3. This module of first type 3 is then located between the said module of second type 4 and a sill 12, which is arranged on the outer side of the motor vehicle 1.

In the event of a side impact, the sill 12 is thus pushed into the module of first type 3, which shifts, accompanied by deformation of the assembly, and converts kinetic energy. The applied force is thus converted into a deformation partly by deformation of the sill 12 and other body parts of the motor vehicle 1 and by the shift of the battery cells 2, which are arranged in the module of first type 3. When the applied force exceeds the absorption capability of the sill 12 and the module of first type 3, a force impacts also the module of second type 4 arranged behind. The latter is shifted in its entirety accordingly, accompanied by a deformation of the longitudinal members 5, since the frame 11 of the module of second type 4 is dimensioned very stable. As a result, the central module of first type 3 is again deformed between the two modules of second type 4. Again, energy is absorbed hereby. Optionally, excess energy is here also transmitted to the second adjacent module of second type 4 and hereby converted into a deformation. As the modules of second type 4 are each arranged underneath the seating area 6, the living space of the occupants is best protected by the stability of the modules of second type 4.

What is claimed is:

1. A motor vehicle, comprising:
   a body;
   a module of a first type accommodating battery elements which are grouped to form an assembly which, when exposed to a force, is deformable while the battery elements are able to shift relative to one another, said module of first type being installed in a first region of the motor vehicle of low stiffness in comparison to a second region of the motor vehicle, in which first region the body of the motor vehicle is designed for a force-dissipating deformation in the event of an accident; and
   a module of a second type accommodating battery elements, said module of second type being shiftable without causing damage thereto, when exposed to a force, while retaining its shape, said module of second type being installed in the second region, in which the body of the motor vehicle is designed to retain its shape in the event of the accident.

2. The motor vehicle of claim 1, further comprising a frame, said module of second type being arranged on the frame and/or part thereof.

3. The motor vehicle of claim 1, further comprising a longitudinal member, said module of second type being arranged longitudinally on the longitudinal member.

4. The motor vehicle of claim 1, further comprising two longitudinal members in spaced-apart relationship, said module of second type configured to connect the two vehicle longitudinal members in a manner of a cross member.

5. The motor vehicle of claim 1, further comprising a longitudinal member, said module of second type being connected to the longitudinal member such as to form a section of the longitudinal member.

6. The motor vehicle of claim 5, wherein the module of second type is connected to the longitudinal member at a surface oriented in or in opposition to a travel direction of the motor vehicle.

7. The motor vehicle of claim 1, further comprising two of said module of first type, said two modules of first type being arranged adjacent to the module of second type.

8. The motor vehicle of claim 7, wherein the two modules of first type are arranged transversely to a travel direction of the motor vehicle.

9. The motor vehicle of claim 1, wherein the module of first type adjoins on two opposite sides modules of the second type.

10. The motor vehicle of claim 1, further comprising an underfloor, at least one of the modules of first type and second type being connected with the underfloor in a force-fitting manner.

11. The motor vehicle of claim 1, further comprising a seating area, said module of second type being arranged underneath the seating area.

12. The motor vehicle of claim 1, further comprising two seating areas, and a tunnel region extending between the two seating areas, said module of first type being arranged underneath the tunnel region.

13. The motor vehicle of claim 1, further comprising a forward structure, said module of first type and said module of second type being arranged in the forward structure.

14. The motor vehicle of claim 1, wherein the module of first type is located in a deformation zone of the motor vehicle.

* * * * *